United States Patent
Chen et al.

(10) Patent No.: US 8,873,069 B2
(45) Date of Patent: Oct. 28, 2014

(54) MOTION SENSING METHOD FOR DETERMINING WHETHER TO PERFORM MOTION SENSING ACCORDING TO DISTANCE DETECTION RESULT AND RELATED APPARATUS THEREOF

(71) Applicant: PixArt Imaging Inc., Hsin-Chu (TW)

(72) Inventors: Hsin-Chia Chen, Hsin-Chu (TW); Yu-Wei Wang, Hsin-Chu (TW); Ching-Lin Chung, Hsin-Chu (TW); Hui-Hsuan Chen, Hsin-Chu (TW); Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 34 days.

(21) Appl. No.: 13/736,933

(22) Filed: Jan. 8, 2013

(65) Prior Publication Data

US 2013/0321826 A1    Dec. 5, 2013

(30) Foreign Application Priority Data

Jun. 4, 2012  (CN) .......................... 2012 1 0183014

(51) Int. Cl.
| G01B 11/14 | (2006.01) |
| G06F 3/041 | (2006.01) |
| G01S 17/08 | (2006.01) |
| G01S 17/48 | (2006.01) |
| G01S 13/56 | (2006.01) |
| G01S 15/52 | (2006.01) |
| G01S 13/08 | (2006.01) |
| G01S 15/08 | (2006.01) |
| G01S 17/87 | (2006.01) |

(52) U.S. Cl.
CPC ................. *G01B 11/14* (2013.01); *G01S 13/08* (2013.01); *G01S 17/08* (2013.01); *G01S 17/48* (2013.01); *G01S 13/56* (2013.01); *G01S 15/523* (2013.01); *G01S 15/08* (2013.01); *G01S 17/87* (2013.01)
USPC ............ 356/614; 356/623; 345/173; 250/221

(58) Field of Classification Search
CPC ......... G01B 11/14; G06T 7/204; G06F 3/041; G01S 17/89; G01S 17/50; G01S 15/523; G08B 13/19; G08B 13/19602; G08B 13/194; G08B 13/19606
USPC ................ 356/614–623, 3.01, 5.01; 250/221; 382/107; 348/155; 342/28, 118; 367/99; 345/173, 156, 163
See application file for complete search history.

(56) References Cited

U.S. PATENT DOCUMENTS

| 2004/0061872 A1* | 4/2004 | Nakano ......................... 356/623 |
| 2008/0094643 A1* | 4/2008 | Nishio et al. .................. 356/623 |
| 2009/0225166 A1* | 9/2009 | Dronge ......................... 348/155 |
| 2010/0031174 A1* | 2/2010 | Kim .............................. 715/764 |
| 2010/0046802 A1* | 2/2010 | Watanabe et al. ............. 382/106 |
| 2010/0277748 A1* | 11/2010 | Potapenko .................... 356/623 |
| 2011/0304842 A1* | 12/2011 | Kao et al. ..................... 356/5.01 |
| 2013/0335346 A1* | 12/2013 | Chen et al. .................... 345/173 |

FOREIGN PATENT DOCUMENTS

EP    2587462 A1 *  5/2013

* cited by examiner

*Primary Examiner* — Hoa Pham
(74) *Attorney, Agent, or Firm* — Winston Hsu; Scott Margo

(57) ABSTRACT

A motion sensing method for an object includes: receiving a distance detection result which is used for indicating distance detection information of the object in a neighborhood of a motion sensing apparatus; and determining whether to perform optical motion sensing upon the object of the neighborhood according to the distance detection result.

22 Claims, 3 Drawing Sheets

MOTION SENSING METHOD FOR DETERMINING WHETHER TO PERFORM MOTION SENSING ACCORDING TO DISTANCE DETECTION RESULT AND RELATED APPARATUS THEREOF

BACKGROUND OF THE INVENTION

1. Field of the Invention

The disclosed embodiments of the present invention relate to a motion sensing mechanism, and more particularly, to a motion sensing method for determining whether to perform motion sensing according to a distance detection result and related apparatus thereof.

2. Description of the Prior Art

In the field of optical technologies, the user is able to use different gestures to manipulate a remote portable electronic device by moving his/her hands. In order to achieve the demand of wireless optical control, the portable electronic device itself must have motion sensing functionality to measure the changes in user's gestures. However, the biggest inconvenience is that the user may be too far away from the portable electronic device, which makes the portable electronic device unable to detect the user. Alternatively, the user may be too close to the portable electronic device, which results in deviation of the sensing result. In addition, continuously performing the motion sensing upon an object (e.g., a user's gesture) during a long period will significantly consume the power of the portable electronic device. Therefore, how to improve the convenience of manipulation and the power efficiency has become a critical issue encountered in this field.

SUMMARY OF THE INVENTION

Therefore, one of the objectives of the present invention is to provide a motion sensing method for determining whether to perform optical motion sensing according to a distance detection result and related apparatus thereof, to improve the convenience of manipulation and the power efficiency.

According to a first aspect of the present invention, a motion sensing method for performing motion sensing upon an object is disclosed. The motion sensing method includes: receiving a distance detection result which is used for indicating distance detection information of the object in a neighboring area of a motion sensing apparatus; and determining whether to perform an optical motion sensing upon the object of the neighboring area according to the distance detection result.

According to a second aspect of the present invention, a motion sensing apparatus for performing motion sensing upon an object is disclosed. The motion sensing apparatus includes a receiving circuit and a motion sensing circuit, wherein the receiving circuit is arranged for receiving a distance detection result which is used for indicating distance detection information of the object in a neighboring area of a motion sensing apparatus; and the motion sensing circuit is coupled to the receiving circuit, and arranged for determining whether to perform optical motion sensing upon the object of the neighboring area according to the distance detection result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
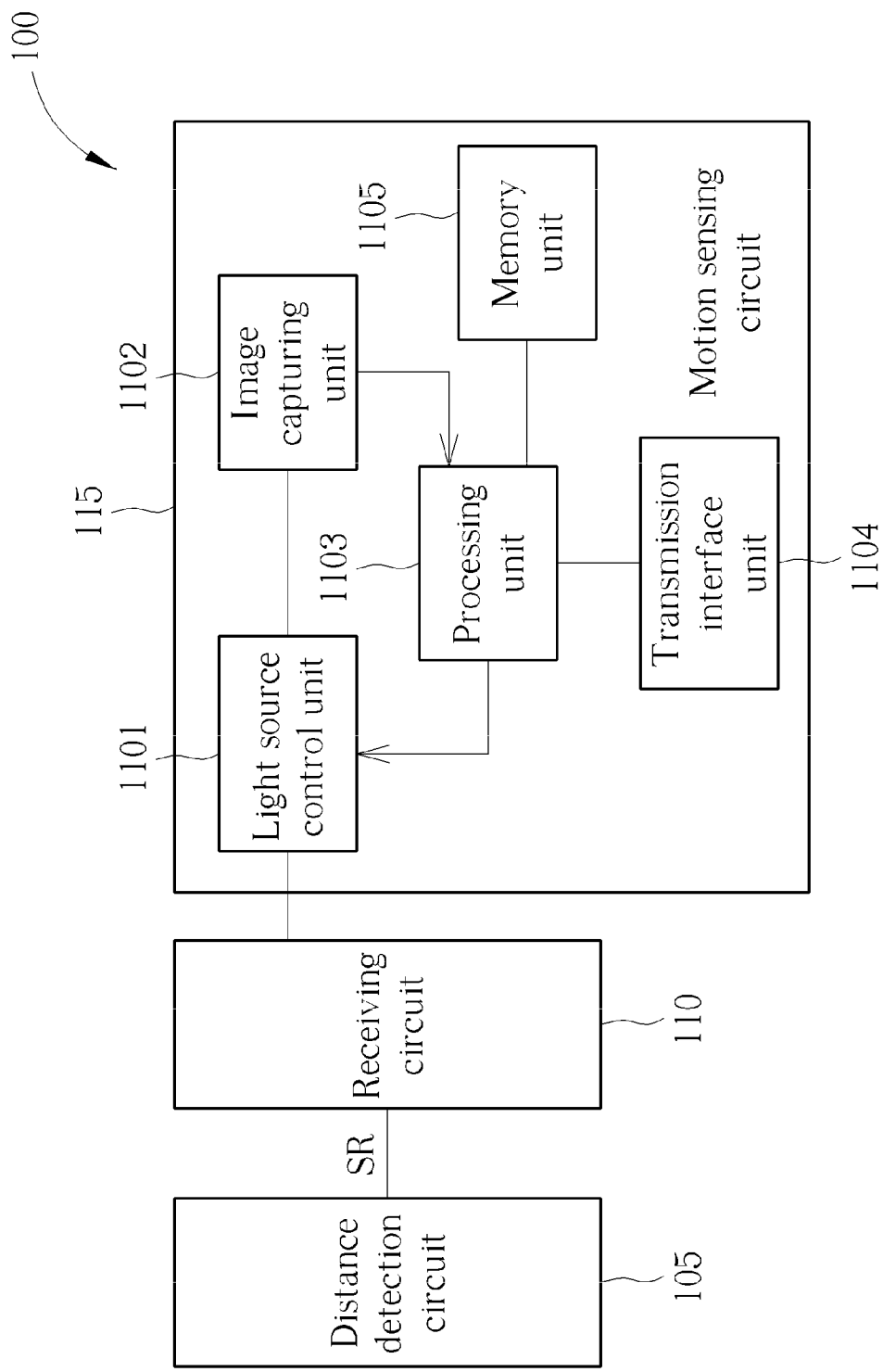
FIG. 1 is a diagram illustrating a motion sensing apparatus according to a first embodiment of the present invention.

Please refer to FIG. 1, which is a diagram illustrating a motion sensing apparatus 100 according to a first embodiment of the present invention. The motion sensing apparatus 100 includes a distance detection circuit 105, a receiving circuit 110, and a motion sensing circuit 115. The distance detection circuit 105 is used for performing a distance detection operation to detect an object in a neighboring area of the motion sensing apparatus 100, and accordingly generating a distance detection result SR. The receiving circuit 110 is coupled to the distance detection circuit 105, and used for receiving the distance detection result SR. With regard to the motion sensing circuit 115, it is coupled to the receiving circuit 110 and indirectly coupled to the distance detection circuit 105, and used for determining whether to perform an optical motion sensing operation according to the distance detection result SR. For example, when the distance detection result SR indicates that the distance between the object and the motion sensing apparatus 100 is too far or too close (i.e., the distance between the object and the motion sensing apparatus 100 does not fall within an appropriate distance range), the motion sensing circuit 115 decides not to perform the optical motion sensing operation upon the object. However, when the distance detection result SR indicates that the distance between the object and the motion sensing apparatus 100 falls within the appropriate distance range, the motion sensing circuit 110 decides to perform the optical motion sensing operation upon the object. Therefore, with the help of the distance detection circuit 105 operative to determine the distance between the object and the motion sensing apparatus 100, the motion sensing circuit 115 is allowed to selectively activate (enable) or deactivate (disable) the optical motion sensing operation. Furthermore, it should be noted that, if the distance detection result SR indicates that the object is not detected, the motion sensing circuit 115 will not start the optical motion sensing operation. Having the optical motion sensing operation remain active for a long time will waste too much power (especially when the motion sensing apparatus 100 is disposed in a portable electronic device). Therefore, by using the distance detection result SR to selectively activate or deactivate the optical motion sensing operation, the optical motion sensing operation can be deactivated in the case where the optical motion sensing operation has poor performance; and the optical motion sensing operation can be activated in the case where the optical motion sensing operation has normal performance, thereby achieving power efficiency/power saving. Generally speaking, the meaning of the optical motion sensing operation is using the light sensor for the continuous detection of light reflected from a surface due to incident light originated from a light source, and tracking the movement on the surface, to thereby perform the motion sensing operation; or using an object to block the light of a light source to prevent the optical sensor from sensing part of the light for tracking the movement of the object, to thereby perform the motion sensing operation.

In practice, when the distance between an object and the motion sensing apparatus 100 is too far or too close, the sensing result obtained by the optical motion sensing operation is relatively poor. Taking the reflected light based optical motion sensing operation for example, when the distance is too far, the optical motion sensing operation has difficulty in measuring the reflected light signal, thus the sensing result is prone to being deviated. However, when the distance is too close, due to the sensed reflected light signal is too strong, the sensing result is also prone to being deviated. Hence, in the embodiment of the present invention, only when the distance between the object and the motion sensing apparatus 100 falls within the appropriate distance range, the subsequent optical sensing operation is allowed to be activated. For the operation of the distance detection circuit 105, the distance detection operation may be optical based or non-optical based. For instance, the distance detection operation is at least one of a triangulation ranging operation, a time of flight (TOF) ranging operation, a phase difference ranging operation, a microwave ranging operation and a sonic ranging operation. In other words, the distance detection operation of the distance detection circuit 105 may be a combination of multiple ranging operations mentioned above. However, the ranging operations mentioned above are for illustrating the operation of the embodiment of the present invention only, and are not meant to be limitations of the present invention.

Figure 2:
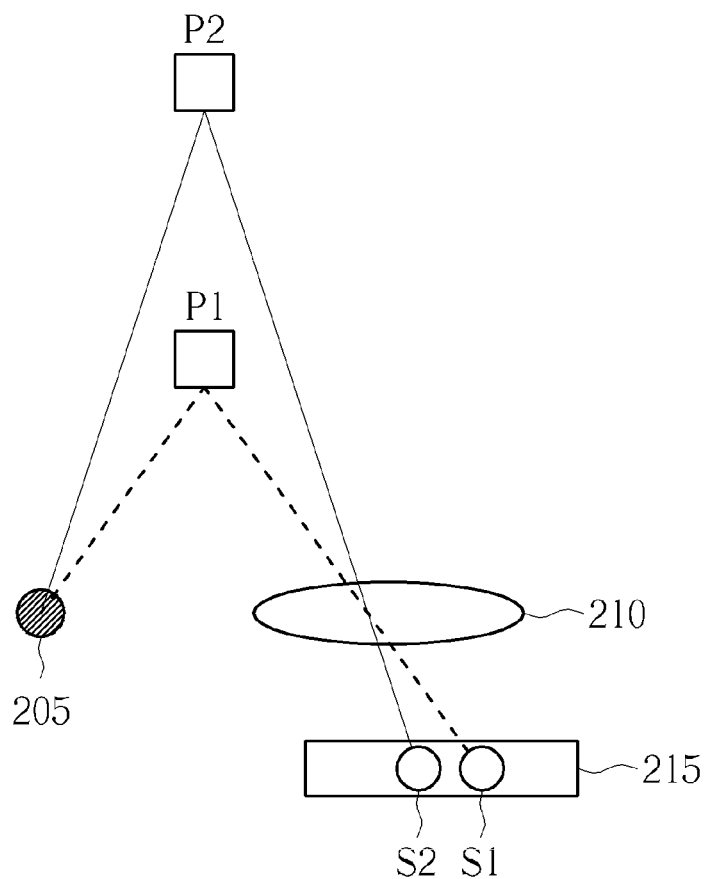
FIG. 2 is a diagram illustrating the operation of the distance detection circuit in FIG. 1.

Please refer to FIG. 2, which is a diagram illustrating the operation of the distance detection circuit 105 shown in FIG. 1. In a preferred embodiment of the present invention, the distance detection circuit 105 uses the triangulation ranging operation, as shown in FIG. 2. When the distance from where the object is located changes, the image location of the reflected light sensed by the sensor will be different. The triangulation ranging operation is to calculate or estimate the distance of the object by referring to the measured image location of the sensed reflected light. For example, when the object is located at location P1 shown in FIG. 2, the optical path of the first light source signal emitted by the light source 205 (whose light intensity can be controlled by the setting of the distance detection circuit 105) is indicated by the dotted line in FIG. 2. The first light source signal is reflected at the location P1, and the reflected light travels to the lens set 210 along the dotted line, passes through the lens set 210, and arrives at location S1 of the sensor 215. The distance detection circuit 105 can estimate that the object is located at the location P1 according to the location S1, and thus obtain the distance between the object and the motion sensing apparatus 100 to produce a distance detection result SR. In another example, when the object is located at location P2 shown in FIG. 2, the optical path of the first light source signal emitted by the light source 205 (whose light intensity can be controlled by the setting of the distance detection circuit 105) is indicated by the solid line in FIG. 2. The first light source signal is reflected at the location P2, and the reflected light travels to the lens set 210 along the solid line, passes through the lens set 210, and arrives at location S2 of the sensor 215. The distance detection circuit 105 can estimate that the object is located at the location P2 according to the location S2, and thus obtain the distance between the object and the motion sensing apparatus 100 to produce a distance detection result SR. Therefore, by referring to the relative location of the imaging on the reference sensor 215, the information of distance between the motion sensing apparatus 100 and the object can be obtained by the detection circuit 105. In other words, the aforementioned embodiment determines whether the received reflected light signal falls within a location range to generate the distance detection result SR by emitting a first light source signal, receiving a corresponding reflected light signal, and checking an imaging location of the reflected light signal on an optical sensor. When the received reflected light signal falls within the location range, the distance detection result SR indicates that the specific distance between the object and the distance sensing apparatus 100 falls within a distance range, and when the received reflected light signal does not fall within the location range, the distance detection result SR indicates that the specific distance between the object and the distance sensing apparatus 100 does not fall within the distance range.

It should be noted that, the triangulation ranging operation shown in FIG. 2 is only for illustrating the operation of one embodiment of the present invention, and is not meant to be limitations of the present invention. In addition, using an optical ranging operation such as the triangulation ranging operation can allow the distance detection circuit 105 and the subsequent motion sensing circuit 115 to share the same optical sensor, thus saving the production cost of the circuit. Further, to make the optical ranging operation have high efficiency, the optical ranging operation in the present invention is used for detecting the distance of an object in a specific direction (e.g., a front side) of the motion sensing apparatus 100. Besides, the detection range of the optical ranging operation can also be extended from a specific direction to a fan-shaped viewing angle range (either of a wide-angle lens and a pinhole aperture is feasible). In addition, the use of non-optical ranging operation has an advantage that the distance of the object in a neighboring area of the motion sensing apparatus 100 can be detected. For example, the microwave ranging operation or the sonic ranging operation is applicable to the detection of the distance of the object in a neighboring area of the motion sensing apparatus 100, to generate the distance detection result SR.

After the aforementioned distance detection result SR is generated, the receiving circuit 110 receives the distance detection result SR and forwards the received distance detection result SR to the motion sensing circuit 115, so that the motion sensing circuit 115 can determine whether to perform the optical motion sensing operation in accordance with the indication of the distance detection result SR. In another embodiment, the receiving circuit 110 and the motion sensing circuit 115 can be implemented as a same circuit block. Besides, in practice, the motion sensing circuit 110 includes a light source control unit 1101, an image capturing unit 1102, a processing unit 1103, a transmission interface unit 1104, and a memory unit 1105, wherein the light source control unit 1101 is used to control, adjust or generate the optical signals emitted by the motion sensing apparatus 100. For example, the light source control unit 1101 can control the optical signals generated while the optical motion sensing operation is being performed. In addition, when the optical distance detection operating is employed by the distance detection operation, the light source control unit 1101 can also control the optical signals generated while the distance detection operation is being performed. For example, as illustrated in the triangulation ranging operation shown in FIG. 2, the intensity of the first light source signal generated by the light source 205 is controlled by the light source control unit 1101 based on the setting of the distance detection circuit 105. When the optical motion sensing operation of the motion sensing circuit 115 is performed, the light source control unit 1101 generates a second light source signal based on the setting of the motion sensing circuit 115 and controls the light intensity of the second light source signal, wherein the light intensity of the second light source signal may be substantially the same as the light intensity of the first light source signal, or may be different from the light intensity of the first light source signal. In other words, the light source control unit 1101 may dynamically control the intensity of the emitted light source signal in accordance with different settings.

Regarding the motion sensing operation of the motion sensing circuit 110, it dynamically compensates for the ambient light interference by utilizing the reflected light of the second light source signal controlled by the light source control unit 1101, and then calculates the motion of the surrounding object by way of image capturing. For example, when the light source control unit 1101 generates the second light source signal to compensate for the ambient light according to the setting of the motion sensing circuit 115, the image capturing unit 1102 begins to capture multiple images. In practice, the image capturing unit 1102 performs the optical image sensing in a certain direction where the object is located. For instance, the image capturing unit 1102 performs the optical image sensing continuously in a specific viewing angle range to capture multiple images at different time points. Next, the processing unit 1103 may compare the multiple images of different time points (e.g., performing correlation operations upon the multiple images) to determine whether the sensed object moves and decide the motion information of the object. By way of example, if the object is one person's hands, the processing unit 1103 can not only detect the movement of the hands, but also identify different gestures of the moving hands. After the motion detection result of the object is generated, the processing circuit 1103 may save the motion detection result or previously captured images into the memory unit 1105, for facilitating other operations. In addition, the processing unit 1103 may transmit the motion detection result or the previously captured images to the transmission interface unit 1104 such that the information is sent to other electronic devices for other applications. Moreover, the processing unit 1103 may also issue instructions to control the light source control unit 1101 according to the motion detection result or the previously captured images, thereby adjusting the light intensity of the light source signal currently emitted from the light source.

Therefore, if the motion sensing circuit 115 decides to perform the optical motion sensing operation, the operations of the light source control unit 1101, the image capturing unit 1102, the processing unit 1103, the transmission interface unit 1104, and the memory unit 1105 will be activated. However, if the motion sensing circuit 110 determines not to perform the optical motion sensing operation, at least one of the operations of the circuit units may be deactivated for power saving purpose. For instance, at least the image capturing unit 1102 can be turned off, so that the sensing and capturing of the optical images can be deactivated currently to save power. Therefore, when the distance detection result SR indicates that a specific distance between the object and the motion sensing apparatus 100 falls within a distance range, the motion sensing circuit 115 then activates the operations of the above-mentioned circuit element for performing the optical motion sensing upon the object; however, when the distance detection result SR indicates that the specific distance does not fall within a distance range, the motion sensing circuit 115 then deactivates the operations of the aforementioned circuit element.

Besides, when generating the aforementioned distance detection result SR, the distance detection circuit 105 may also be utilized to detect the presence of an object, and use the distance detection result SR to indicate the presence of an object. For example, the distance detection circuit 105 may control the light source 205 to emit the first light source signal; monitor the intensity of a reflected light signal received within a specific time; and determine whether the intensity of the received reflected light signal is lower than a threshold. If the intensity of the reflected light signal is lower than the threshold (e.g., the minimum threshold), the distance detection circuit 105 determines that no object is detected by the distance detection operation. In other words, when the signal intensity of the reflected light is too weak or even not received, the distance detection result SR generated by the distance detection circuit 105 indicates the object is not detected. Therefore, according to the generated distance detection result SR, the subsequent motion sensing circuit 115 can appropriately determine whether to perform the optical motion sensing operation. In this embodiment, due to the fact that the object is not detected, the motion sensing circuit 115 decides not to perform the optical motion sensing operation.

In addition to the above-mentioned advantage of lower power consumption, the motion sensing apparatus 100 in the above-mentioned embodiments of the present invention can also achieve the effect of appropriate interaction with users. For example, the transmission interface unit 1104 of the motion sensing apparatus 100 may be equipped with interactive functionality. When the distance detection result SR indicates that the object (e.g., the user itself) is too far or too close to fall within a specific appropriate distance range, the user can be notified by a signal (e.g., a voice warning message) generated by the transmission interface unit 1104, and then change the distance between the motion sensing device 100. In this way, an appropriate distance between the user and the motion sensing apparatus 100 is ensured in the following distance detection operation, thus facilitating the user manipulation of the electronic apparatus. For example, the motion sensing apparatus 100 may be disposed in a model car or other portable electronic toy, and the user can use gestures to control the behavior of the portable electronic toy through the motion sensing apparatus 100. When the distance between the user and the portable electronic toy to be controlled is too far, the motion sensing apparatus 100 with distance detection operation can detect that the distance is too far and then notify the user, thus facilitating the manipulation of the portable electronic toy.

Figure 3:
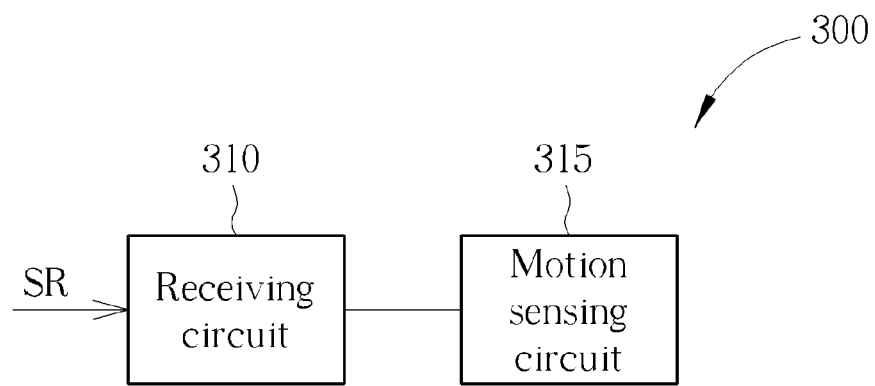
FIG. 3 is a diagram illustrating the motion sensing apparatus according to a second embodiment of the present invention.

Further, in other embodiments, the motion sensing apparatus may be configured to omit the distance detection circuit and related operations thereof. In other words, the distance detection results are generated by the external circuit element of the motion sensing apparatus. Please refer to FIG. 3, which is a diagram illustrating the motion sensing apparatus 300 according to a second embodiment of the present invention. The motion sensing apparatus 300 has a receiving circuit 310 and a motion sensing circuit 315, wherein no distance detection circuit is implemented in the motion sensing apparatus 300. As the functions and operations of the receiving circuit 310 and the motion sensing circuit 315 are substantially the same as that of the aforementioned receiving circuit 110 and motion sensing circuit 315 shown in FIG. 1, further description is omitted here for brevity.

Figure 4:
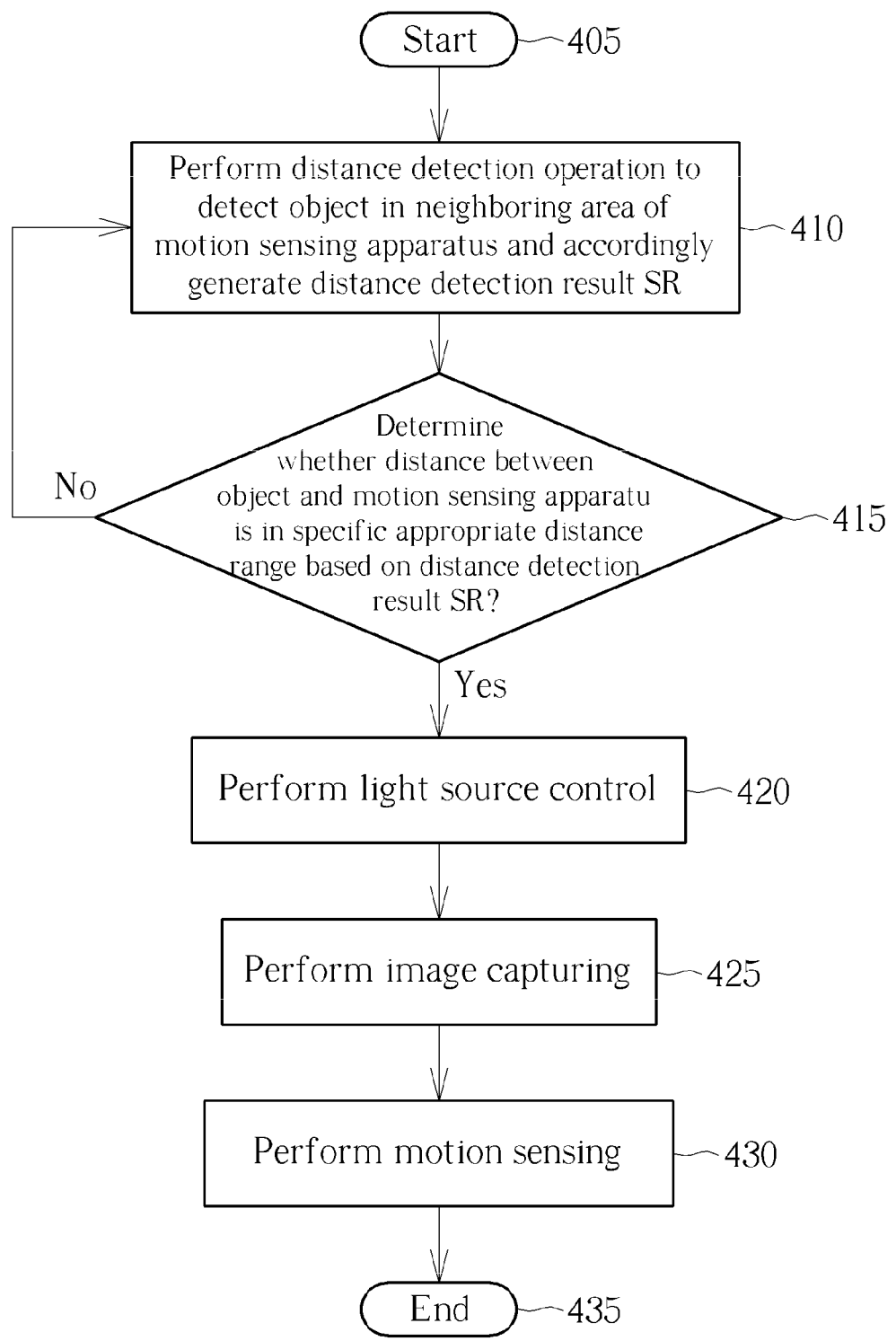
FIG. 4 is a simplified diagram illustrating operations of the motion sensing apparatus shown in FIG. 1.

Please refer to FIG. 4 for better understanding of the spirit of the present invention. FIG. 4 is a simplified flowchart illustrating operations of the motion sensing apparatus 100 shown in FIG. 1. Provided that substantially the same result is achieved, the steps of the flowchart shown in FIG. 4 need not be in the exact order shown and need not be contiguous; that is, other steps can be intermediate. Besides, some of the steps shown in FIG. 4 can be omitted according to different embodiments or design requirements. The flow is described as follows:

Step 405: Start;

Step 410: Perform a distance detection operation to detect an object in a neighboring area of a motion sensing apparatus 100 and accordingly generate a distance detection result SR;

Step 415: Determine whether the distance between the object and the motion sensing apparatus 100 is in a specific appropriate distance range based on the distance detection result SR. If yes, proceed with step 420; otherwise, proceed with step 410 to keep performing the distance detection operation;

Step 420: Perform the light source control for generating and emitting an optical signal to compensate for effects resulting from the ambient light;

Step 425: Perform the image capturing at different time points to generate the sensed images used for determining whether the motion of the object exists and deciding the motion information;

Step 430: Perform the motion sensing upon the object according to the sensed images; and Step 435: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion sensing method for performing motion sensing upon an object, comprising:
   receiving a distance detection result which is used for indicating distance detection information of the object in a neighboring area of a motion sensing apparatus;
   determining whether to perform an optical motion sensing operation upon the object of the neighboring area according to the distance detection result;
   deactivating at least one operation of light source controlling and image capturing when a specific distance between the object and the motion sensing apparatus does not fall within a distance range; and
   dynamically adjusting intensity of a light source signal to compensate ambient light interference and performing image capturing upon the object when the specific distance falls within the distance range.

2. The motion sensing method of claim 1, further comprising:
   performing a distance detection operation to detect the object in the neighboring area of the motion sensing method, and accordingly generating the distance detection result.

3. The motion sensing method of claim 2, wherein the step of detecting the object in the neighboring area of the motion sensing apparatus comprises:
   detecting the object in a specific direction of the motion sensing apparatus.

4. The motion sensing method of claim 3, wherein the distance detection operation comprises at least one of a triangulation ranging operation, a time of flight ranging operation, and a phase difference ranging operation.

5. The motion sensing method of claim 2, wherein the step of detecting the object in the neighboring area of the motion sensing apparatus comprises:
   detecting the object in a surrounding direction of the motion sensing apparatus.

6. The motion sensing method of claim 5, wherein the distance detection operation is at least one of a microwave ranging operation and a sonic ranging operation.

7. The motion sensing method of claim 2, wherein the step of performing the distance detection operation to generate the distance detection result comprises:
   emitting a first light source signal;
   receiving a reflected light signal; and
   determining whether the received reflected light signal falls within a location range according to an imaging location of the reflected light signal on a sensor, and accordingly generating the distance detection result.

8. The motion sensing method of claim 7, wherein the step of generating the distance detection result comprises:
   when the received reflected light signal falls within the location range, generating the distance detection result to indicate that the specific distance between the object and the motion sensing apparatus falls within the distance range; and
   when the received reflected light signal does not fall within the location range, generating the distance detection result to indicate that the specific distance does not fall within the distance range.

9. The motion sensing method of claim 7, further comprising:
   when a signal intensity of the reflected light signal is lower than a threshold, generating the distance detection result to indicate that the object is not detected.

10. The motion sensing method of claim 7, further comprising:
    when it is determined to perform the optical motion sensing operation upon the object, emitting a second light source signal to the object, wherein the second light source signal is different from the first light source signal;
    capturing a plurality of sensed images; and
    determining motion of the object according to the sensed images.

11. The motion sensing method of claim 1, wherein:
    when the distance detection result indicates the specific distance between the object and the motion sensing apparatus falls within the distance range, performing the optical motion sensing operation upon the object; and
    when the distance detection result indicates the specific distance does not fall within the distance range, not performing the optical motion sensing operation upon the object.

12. A motion sensing apparatus for performing motion sensing upon an object, comprising:
    a receiving circuit, arranged for receiving a distance detection result which is used for indicating distance detection information of the object in a neighboring area of a motion sensing apparatus; and
    a motion sensing circuit, coupled to the receiving circuit, the motion sensing circuit arranged for determining whether to perform an optical motion sensing operation upon the object of the neighboring area according to the distance detection results;

wherein at least one operation of light source controlling and image capturing included by the motion sensing circuit is deactivated when a distance between the object and the motion sensing apparatus does not fall within a predetermined distance range; and, the motion sensing circuit is arranged for dynamically adjusting intensity of a light source signal to compensate ambient light interference and performing image capturing upon the object when the distance falls within the predetermined distance range.

13. The motion sensing apparatus of claim 12, further comprising:
a distance detection circuit, coupled to the receiving circuit, the distance detection circuit arranged for performing a distance detection operation to detect the object in the neighboring area of the motion sensing apparatus, and accordingly generating the distance detection result.

14. The motion sensing apparatus of claim 13, wherein the distance detection circuit detects the object in a specific direction of the motion sensing apparatus.

15. The motion sensing apparatus of claim 14, wherein the distance detection operation comprises at least one of a triangulation ranging operation, a time of flight ranging operation, and a phase difference ranging operation.

16. The motion sensing apparatus of claim 13, wherein the distance detection circuit detects the object in a surrounding direction of the motion sensing apparatus.

17. The motion sensing apparatus of claim 16, wherein the distance detection operation is at least one of a microwave ranging operation and a sonic ranging operation.

18. The motion sensing apparatus of claim 13, wherein the distance detection circuit generates the distance detection result by emitting a first light source signal, receiving a reflected light signal, and determining whether the received reflected light signal falls within a locations range according to an imaging location of the reflected light signal on a sensor.

19. The motion sensing apparatus of claim 18, wherein when the received reflected light signal falls within the location range, the distance detection circuit generates the distance detection result to indicate that the specific distance between the object and the motion sensing apparatus falls within the distance range; and when the received reflected light signal does not fall within the location range, the distance detection circuit generates the distance detection result to indicate that the specific distance does not fall within the distance range.

20. The motion sensing apparatus of claim 18, wherein when a signal intensity of the reflected light signal is lower than a threshold, the distance detection circuit generates the distance detection result to indicate that the object is not detected.

21. The motion sensing apparatus of claim 18, wherein when it is determined to perform the optical motion sensing operation upon the object, the motion sensing circuit emits a second light source signal to the object, wherein the second light source signal is different from the first light source signal; captures a plurality of sensed images; and determines motion of the object according to the sensed images.

22. The motion sensing apparatus of claim 12, wherein when the distance detection result indicates that the specific distance between the object and the motion sensing apparatus falls within the distance range, the motion sensing circuit performs the optical motion sensing operation upon the object; and when the distance detection result indicates that the specific distance does not fall within the distance range, the motion sensing circuit does not perform the optical motion sensing operation upon the object.

* * * * *